United States Patent [19]
Bobo et al.

[11] 3,886,937
[45] June 3, 1975

[54] MEDICAL ADMINISTRATION SET FOR DISPENSING PLURAL MEDICAL LIQUIDS

[75] Inventors: Donald E. Bobo, Canoga Park; Charles J. McPhee, Sylmar, both of Calif.

[73] Assignee: American Hospital Supply Corporation, Evanston, Ill.

[22] Filed: May 7, 1973

[21] Appl. No.: 357,677

Related U.S. Application Data

[63] Continuation of Ser. No. 114,946, Feb. 2, 1971, abandoned.

[52] U.S. Cl............. 128/214 R; 128/227; 137/113; 222/129.2; 222/145
[51] Int. Cl........................................... A61m 05/14
[58] Field of Search......... 128/214 R, 214 C, 214.2, 128/227, 213; 222/57, 129.2, 145, 137/113, 525.3

[56] References Cited
UNITED STATES PATENTS

| | | | |
|---|---|---|---|
| 2,129,983 | 9/1938 | Bacon | 128/214 C |
| 2,962,193 | 11/1960 | Totten | 222/145 |
| 2,989,052 | 6/1961 | Broman | 128/214 C |
| 2,999,499 | 9/1961 | Willet | 128/214 R |
| 3,177,870 | 4/1965 | Salem et al. | 128/214.2 |
| 3,217,711 | 11/1965 | Pecina et al. | 128/214 C |
| 3,332,418 | 7/1967 | Brody | 128/214 R |
| 3,463,159 | 8/1969 | Heimlich | 128/350 V |
| 3,568,977 | 3/1971 | Nelson | 137/525.3 X |
| 3,595,467 | 7/1971 | Goglio | 137/525.3 X |

*Primary Examiner*—Dalton L. Truluck
*Attorney, Agent, or Firm*—Larry N. Barger; Robert T. Merrick

[57] ABSTRACT

A tubular "Y" administration set for sequentially delivering a plurality of medical liquids to a patient over prolonged periods of time. A low pressure responsive valve located in a first arm of the "Y" set, has a movable internal structure that automatically opens and closes the first arm in response to changes in relative surface level heights of two gravity feed liquids supplied to the set's first and second arms. As these relative surface levels change, the valve's movable internal structure automatically goes through an open-close-open sequence to cause flow from the arms to the leg in a first-second-first arm sequence.

4 Claims, 4 Drawing Figures

LIQUID "A" FLOW

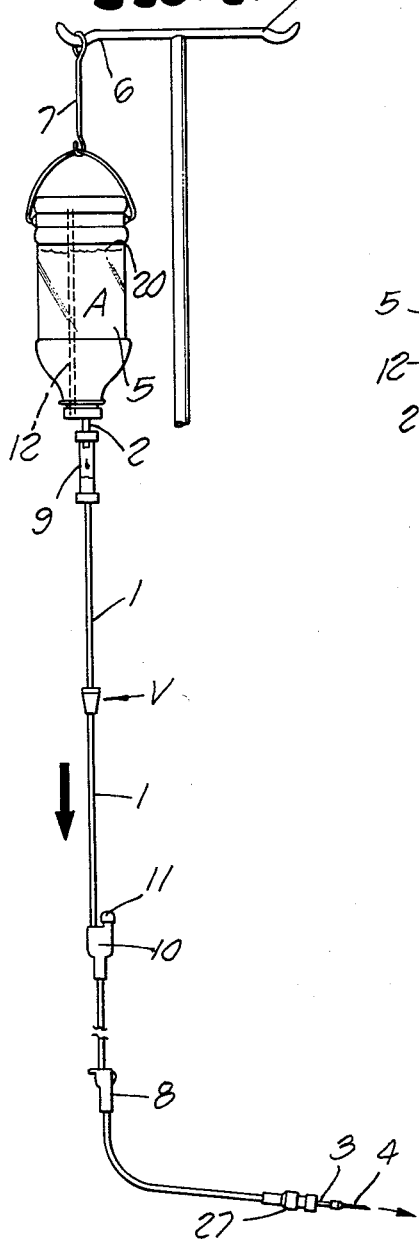
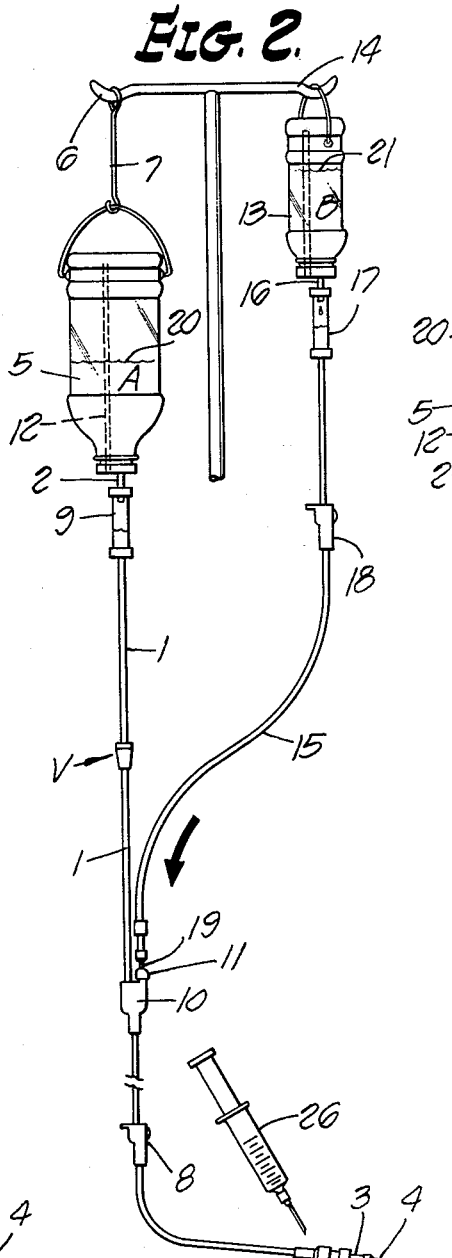
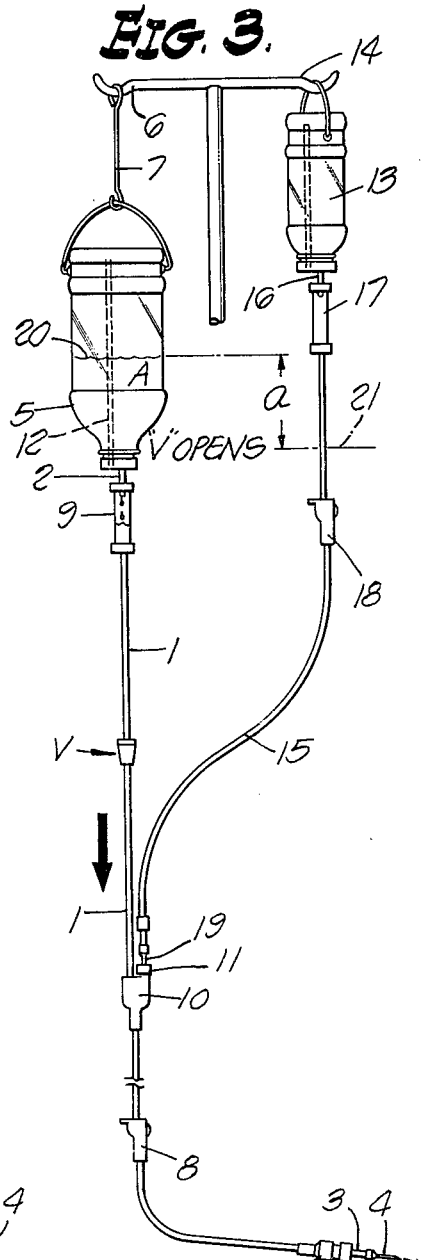

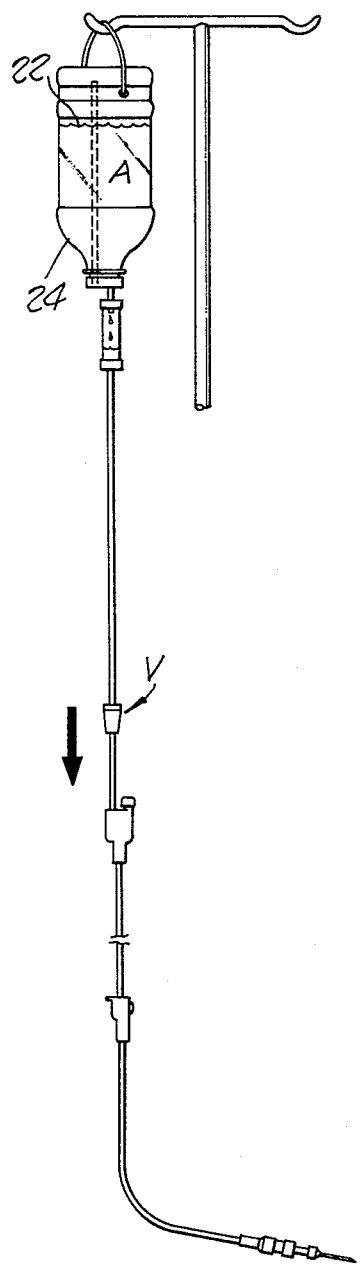
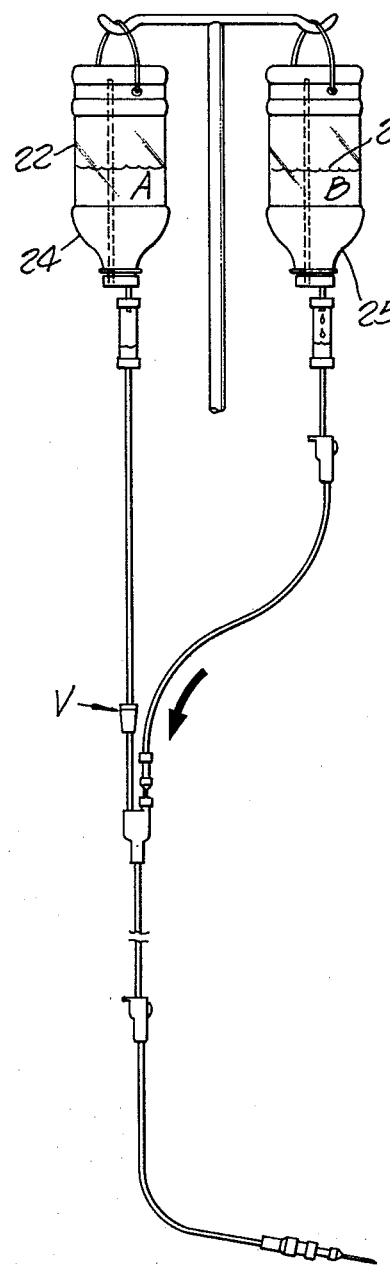
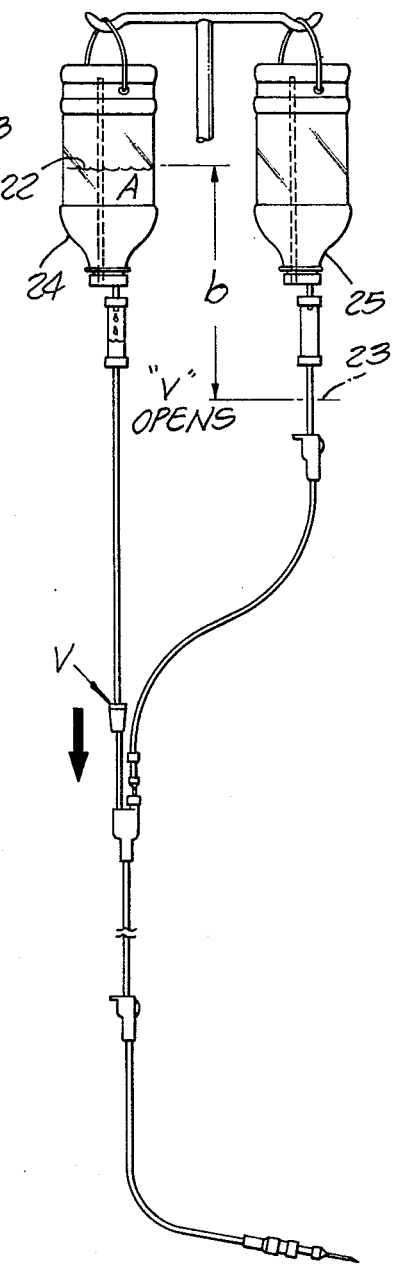

DONALD E. BOBO
CHARLES J. McPHEE
INVENTORS.

BY Larry N. Barger
ATTORNEY

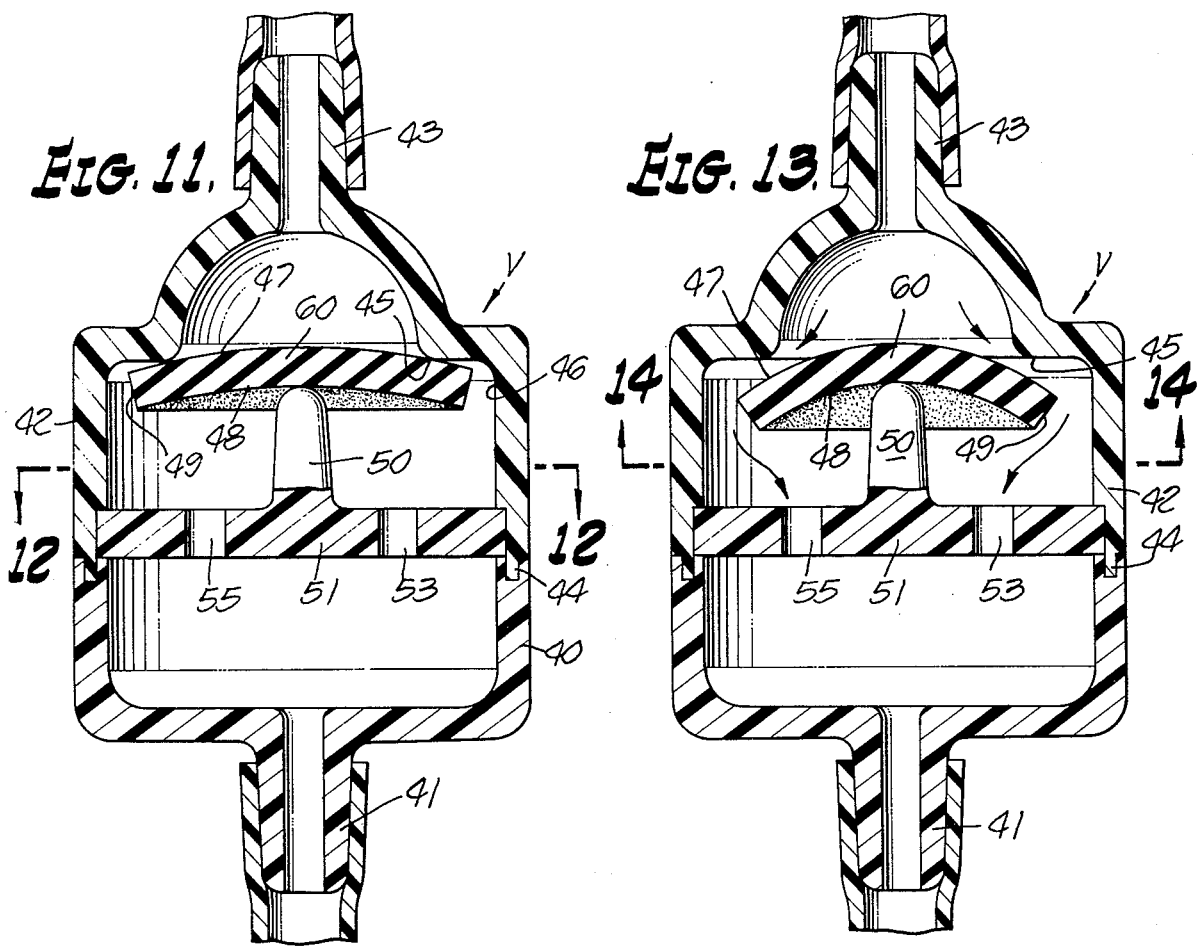
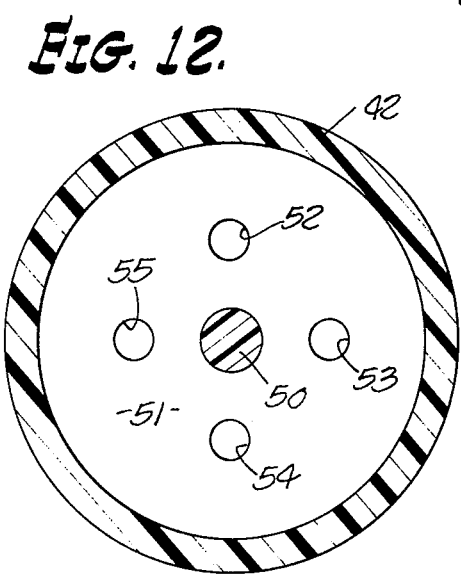
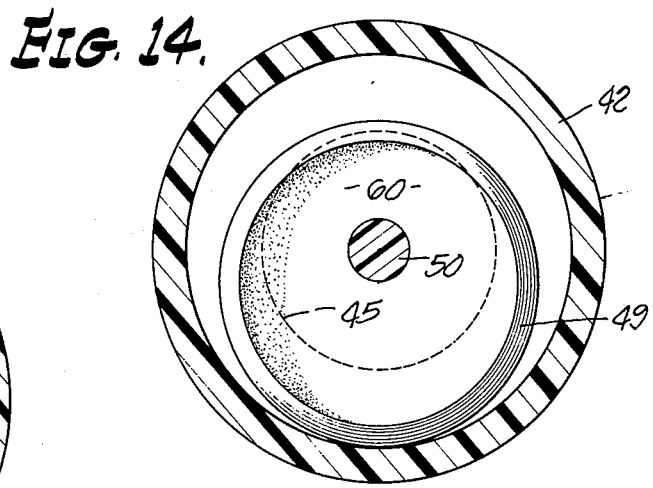

MEDICAL ADMINISTRATION SET FOR DISPENSING PLURAL MEDICAL LIQUIDS

This is a continuation of application Ser. No. 114,946, filed Feb. 2, 1971, now abandoned.

BACKGROUND

Many medical liquids such as 5% dextrose, normal saline, blood, various solutions of electrolytes, etc. are administered to patients over prolonged periods of time. Such a liquid is very frequently administered intravenously from a bottle suspended above a patient. Liquid flows by gravity from the bottle through a flexible tube system known as an "administration set" and into the patient's vein through a venous needle. Bottles used for these liquids may range in volume from 250 ml. to 2,000 ml. and deliver liquids to the patient at rates from 10 ml./hr. to 500 ml./hr.

Sometimes when a patient is receiving intravenous liquid, his physician wants to get an additive or secondary liquid into the patient's vein. For instance, if the patient is getting normal saline at 250 ml/hr., the physician may want to temporarily interrupt the saline administration, intravenously administer a pint of blood at 250 ml./hr., and then resume the saline administration. It is highly desirable to administer both the saline and blood through a single needle in the patient's vein. This avoids the pain and trauma to the patient of another venipuncture when a secondary liquid is administered.

One common procedure for getting a secondary or additive liquid into the patient, without making a second venipuncture, is to use a hypodermic syringe and inject the secondary liquid into the tubular administration set used to administer the primary liquid. Very often, a rubber puncture pad is provided on the administration set for this particular purpose. This "syringe" method works very well for injecting small quantities of the secondary liquid. For instance, 5 to 20 ml. can be administered almost instantaneously, while a nurse or physician is standing by the administration set. When the secondary liquid is of a large volume greater than syringe capacity, or is to be administered over a prolonged period, such as an hour, the syringe method is not suitable.

For administration of large volumes of a secondary liquid over a prolonged time, many types of tubing arrangements have been tried. Some of these were "Y" type administration sets with a series of manually operated pinch clamps on two arms of the set that connected to supply bottles of the primary and secondary liquids. This arrangement had the disadvantage of requiring a nurse to be present when the secondary liquid bottle emptied, so she could manually switch the administration back to the primary liquid before any air got into a leg of the "Y" set. Such air might be pushed through the leg of the set and into the patient's vein, where it could cause an embolism.

Another administration set for delivering primary and secondary liquids to a patient, proposed using fixed constrictions at a juncture of passages from two arms of a "Y" administration. The friction and pressure at these constrictions were to allow liquid in one arm to begin flow after liquid in the other arm was exhausted. Such a fixed constriction arrangement in a "Y" set would have several disadvantages. For one thing, the constriction would always provide an open passage between the two arms, and some mixing could occur. When administering a secondary liquid, a physician sometimes does not want the secondary liquid materially diluted with the primary liquid before it gets into the patient. This is so that the secondary liquid will enter the patient at full strength and can immediately begin performing its function. Another problem with a fixed constriction, is that the range of liquid flow rates, over which the set can be used, is very limited. A fixed constriction that operates at 20 ml./hr. probably would not function properly at 500 ml./hr. Also, liquids sometimes vary widely in viscosities, specific gravities, etc. A fixed constriction would likely be operable with only medical liquids having similar viscosities, specific gravities, etc.

SUMMARY OF THE INVENTION

Our invention overcomes these problems and includes an administration set with a very special valve that has an automatically movable internal structure located in a conduit between an upper end for attaching to a primary liquid container and a side port for attaching to a tube leading from a secondary liquid container. When the conduit is so connected with a secondary liquid container, a "Y" type administration set is formed. This special valve's internal structure automatically opens and closes the primary liquid arm of the set in response to changes in relative liquid level heights of gravity-fed primary and secondary liquids.

For administering medical liquids to a patient, a nurse can connect the conduit to a primary liquid container, make a venipuncture, and begin administration of the primary liquid. Before the primary liquid is exhausted, she can attach a connecting tube from a secondary liquid container to the conduit's side port. This causes the valve's internal structure to automatically close off the primary liquid flow. The nurse can then leave the patient and to about her other duties. The secondary liquid, which might be 500 ml. to be delivered over a period of 2 hours, will drain by gravity to the patient. When the secondary liquid container is empty, but before the liquid level in its connecting tube reaches the side port and admits air into a leg of the "Y" set, the valve's internal structure automatically opens and flow of primary liquid resumes. This changes back to the primary liquid occurs automatically, and a nurse or physician need not be present when it happens.

DRAWINGS

FIG. 1 is a front elevational view of the administration set connected to a primary liquid container and showing flow of primary liquid;

FIG. 2 is a front elevational view of the administration set after a secondary liquid container has been connected and supported above the primary liquid container, and showing the secondary liquid flowing;

FIG. 3 is a front elevation view of the administration set similar to FIG. 2, but illustrating a condition after the secondary liquid container has emptied and flow of primary liquid has resumed;

Figure 7:
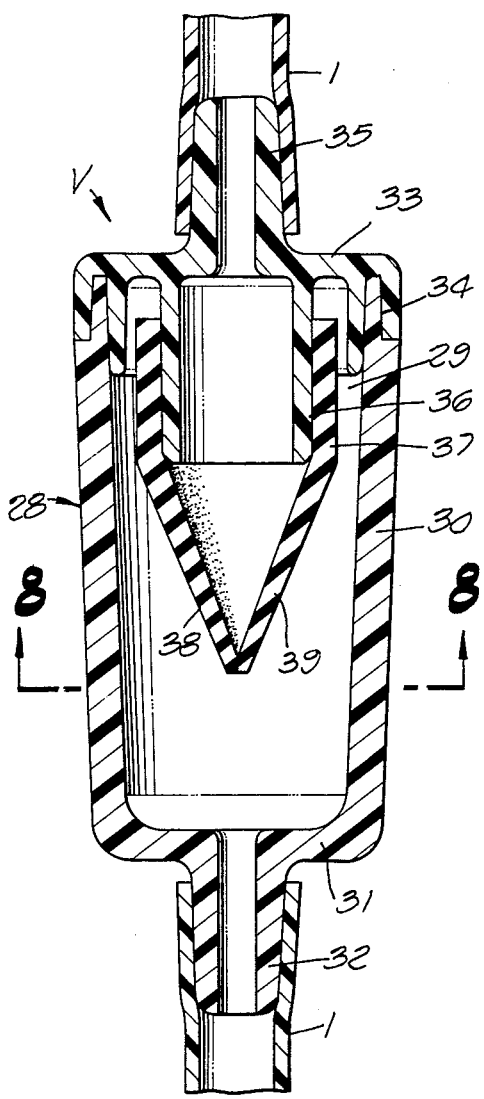
Figure 9:
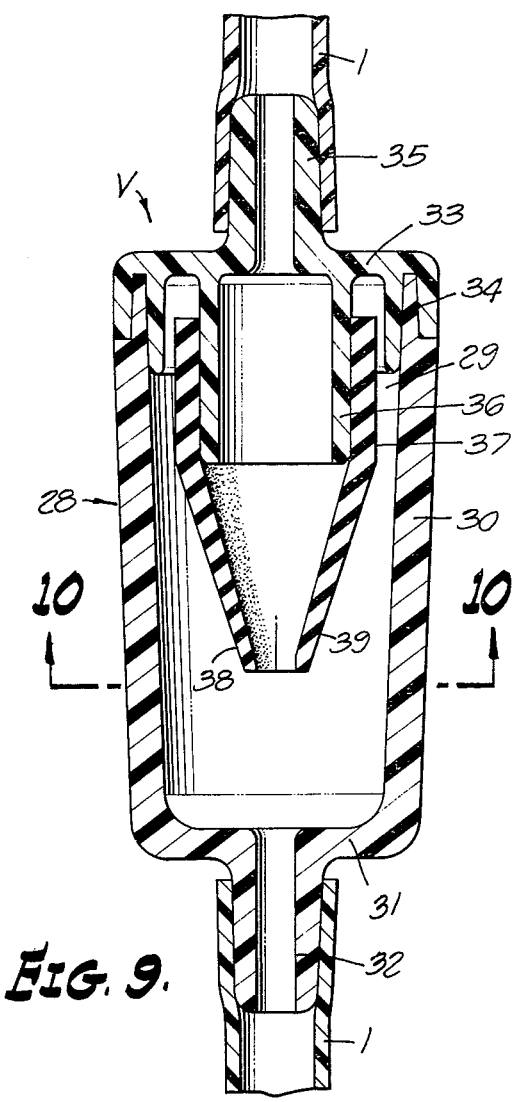
Figure 8:
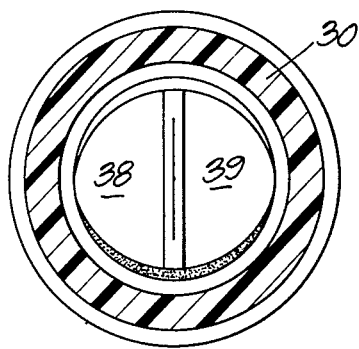
Figure 10:
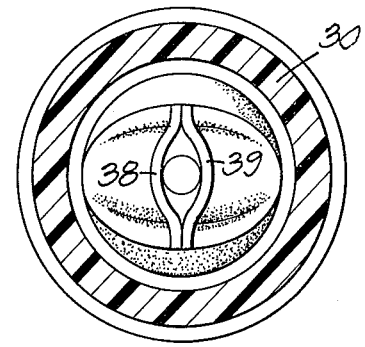

FIGS. 4, 5, and 6 show a sequences of steps in the administration of two liquids similar to FIGS. 1, 2 and 3, but here, the primary and secondary liquid containers are supported from generally the same height and are the same size;

FIG. 7 is an enlarged sectional view of a first embodiment of the special low pressure responsive valve shown in FIGS. 1–6, the valve of this view being in a closed position;

FIG. 8 is a sectional view taken along line 8—8 of FIG. 7;

FIG. 9 is an enlarged sectional view of the valve of FIG. 7, but here, the valve's internal structure is shown in open position;

FIG. 10 is a sectional view taken along line 10—10 of FIG. 9;

FIG. 11 is an enlarged sectional view of a second embodiment of the special low pressure valve shown in closed position;

FIG. 12 is a sectional view taken along line 12—12 of FIG. 11;

FIG. 13 is an enlarged sectional view of the valve of FIG. 11, but showing the valve's movable internal structure in open position; and FIG. 14 is a sectional view taken along line 14—14 of FIG. 13.

DETAILED DESCRIPTION

FIGS. 1 to 3 show the sequence through which two medical liquids can be dispensed to a patient with the administration set of our invention. As an initial step in this sequence the tubular administration, which includes conduit 1 with a hollow spike 2 at one end and a needle adapter 3 at an opposite end, is removed from a sterile package (not shown) in which the manufacturer supplies the administration set to the hospital. After a hypodermic needle 4 is connected to adapter 3 and the hollow spike 2 is connected with a closure system of a primary liquid bottle 5, this combination is suspended from a hanger 6 above the patient. In FIG. 1, primary bottle 5 is suspended below the hanger 6 by means of a wire extension 7 that has a hook or loop on each end. The purpose of the wire extension 7 will be discussed in more detail, subsequently, when the liquid administration of FIGS. 2 and 3 are fully explained.

Once the nurse has the administration set connected to primary bottle 5 and needle 4, she opens roller clamp 8 slightly so the primary liquid can flow into the conduit and flush out any air. When the conduit is liquid filled, a venipuncture of the patient is made with needle 4.

As shown in FIG. 1, the conduit leading from primary bottle 5 to needle 4 has a drip housing 9 connected to hollow spike 2 and a branch coupler 10 that is located between upper and lower ends of the conduit. Coupler 10 defines a side port into the conduit and the side port is closed off by a puncturable resealable pad 11. This coupler 10 can be a coupler such as described in the George Brody U.S. Pat. No. 3,332,418. Connected to conduit below the coupler is roller clamp 8 that can be manually adjusted to provide a generally uniform flow rate to needle 4. A low pressure responsive valve "V" is connected in series with the conduit above the coupler 10 and this valve has a movable internal structure that automatically opens and closes the conduit above the coupler 10 to effect sequential delivery of liquids. Valve "V" is a very important aspect of our invention and its structure and function will be explored in detail later.

In FIG. 1, the primary liquid bottle is shown with primary liquid A flowing out of this bottle, through spike 2 and into an enlarged chamber of drip housing 9 where countable drops are formed. By knowing the number of drops entering the drip housing per minute, the flow rate in ml./hr. can be calculated. As liquid A drains from primary bottle 5, it is replaced with air entering air tube 12. Primary liquid A flows from the drip housing 9, down along the conduit, and through the valve "V." Valve "V" has its movable internal structure held in open position in FIG. 1 so liquid can pass. While valve "V" and coupler 10 are shown vertically spaced apart and connected by a length of flexible tubing, these two components could be formed as portions of a single rigid thermoplastic unit with no flexible tubing between them if desired.

The administration set of this invention is very useful for either administering a single medical liquid or administering a plurality of liquids in a given sequence. As used in FIG. 1, the set can be discarded after administering only a single liquid A as are many conventional tubular administration sets. However, with special valve "V" in the conduit, the physician has an option of whether or not a secondary liquid is administered with the set. For instance, the physician might believe that the patient will respond properly with the infusion of only medical liquid A. If the patient does respond, then our administration set is used only in the combination shown in FIG. 1. Suppose however, that a physician starts the patient on liquid A and, after one-half of bottle 5 has been administered, he examines the patient. The patient is not responding as desired on only liquid A. The physician wants to halt liquid A, infuse a given amount of liquid B over a prolonged period of time, and then return to liquid A administration. Our set gives him this option. Here is how the secondary liquid B is administered with our set.

To administer a secondary liquid in the above described sequence, a secondary bottle 13 is hung from hanger 14 as shown in FIG. 2. Because bottle 13 has no wire extension, it is supported at a higher level than bottle 5. A connecting tube 15 with a hollow spike 16, drip housing 17, roller clamp 18, and needle 19 was previously connected with the secondary bottle 13 and is permitted to hang downwardly from the bottle. After air is flushed from the connecting tube 15 by slowly opening roller clamp 18 and allowing liquid to fill this tube, needle 19 is shoved into the puncturable resealable pad 11. When the conduit 1 and connecting tube 15 are so joined at coupler 10, a "Y" type administration set is formed with primary and secondary arms feeding into a common leg at a juncture. This leg carries liquid from the juncture to the needle.

As shown in FIG. 2, the secondary liquid B has caused valve "V" to automatically close. A hydrostatic head differential, across valve "V," urging the valve to close is caused by the relative heights of the primary liquid surface level 20 and the secondary liquid surface level 21. The movable internal structure of valve "V" reverts to its normally closed biased position and sharply cuts off liquid A flow. This cut off is very dramatically obsrved when the primary and secondary liquids are of two different colors. Take for instance a red colored primary liquid A being dispensed in FIG. 1. Now a clear transparent secondary liquid B is connected as in FIG. 2. When this occurs, valve "V" almost instantaneously closes and the dripping in drip housing 9 slows to a halt. The liquid in the conduit leg becomes transparent showing there is little or no mixing of liquids A and B in the FIG. 2 administration.

After the nurse has set up the administration as shown in FIG. 2, she can either manually close clamp 18 after a measured volume of liquid B has drained, or she can leave the patient's bedside and go about her other nursing duties when the whole bottle is to be administered. When the secondary bottle 13 empties, which may be an hour or more later, the secondary liquid surface level 21 drops down into the connecting tube 15 until it is a distance $a$ below the primary liquid surface level 20. This causes the valve's movable internal structure to automatically open, and administration of liquid A resumes. This switch over from liquid B to liquid A in FIG. 3 is a very important feature of the invention. First of all, it does not require a nurse's presence to turn knobs, handles, etc., on manually operated valves, nor to operate a plunger of a hypodermic syringe. Secondly, the valve's internal structure in the FIG. 3 arrangement, opens sufficiently wide so the leg of the formed "Y" set receives liquid A as fast as it can be dispensed through roller clamp 8 to needle 4.

It is important to realize that in FIGS. 1, 2 and 3, the flow rate to the patient is always controlled with roller clamp 8, below the side part. Roller clamp 18, located above the side port, is used merely as an on-off valve, and does not control flow rate to the patient. With this arrangement, the flow rate to the patient remains generally constant at roller clamp 8 setting, regardless of whether the leg of the "Y" set is receiving liquid A or liquid B. The small pressure drop across valve "V" and the conduit's internal surface characteristics would cause only very slight variances in the generally constant flow rate even at the instance of change over from one liquid to the other. There also might be a slight and gradual drift in flow rate caused by small hydrostatic head changes as the liquid level lowers in the bottle. However, there is no abrupt interruption or surge of liquid as might occur with an almost instantaneous injection of liquid into the set with a hypodermic syringe.

Another very important feature of our administration set's performance is clearly illustrated in FIG. 3. In this figure, the secondary liquid level 21, which is a distance $a$ below primary liquid level 20, is still above the side port when the valve "V" opens, and administration of the primary liquid resumes. During the change over from liquid B to liquid A, no air above the surface level 21 enters the side port. This is a safety feature that prevents an air bubble or large slug of air from entering the leg of the "Y" set and being forced into the patient's vein, where it could cause a serious embolism.

Since the leg is liquid filled and contains no air, additional and different secondary liquid bottles can be substituted for bottle 13. This is done by pulling out needle 19 from coupler 10 and repeating the procedure described for forming the "Y" set of FIG. 2. Thus, three, four, or more different secondary liquids can be administered through the single venous needle 4. Additional and different primary liquids can be administered by disconnecting bottle 5 and substituting another liquid filled bottle. When this is done, care must be taken not to get any air into conduit 1 below the drip housing 9.

When administering a secondary liquid as in FIG. 2, it is sometimes important to administer essentially all of the liquid to the patient before resumption of the primary liquid. This can be done by manually pinching the conduit 1 above valve "V" and draining the secondary liquid until its level is very near coupler 10. Then the pinched conduit 1 is released. In this manner liquid in connecting tube 15 is also administered.

Throughout the sequence shown in FIGS. 1–3, the primary and secondary liquids are administered by gravity feed from relatively low heights. When the needle 4 is in the vein of the patient, bottles 5 and 13 are supported less than 6 feet above the needle. Gravity feed from such a height does not create a sufficiently large head pressure required to operate many valves. However, valve "V," shown in FIGS. 1–3, does operate at these very low pressures, and will open and close in response to relative changes between primary and secondary surface levels 20 and 21 in the range of only 1 to 20 inches of water. The valve "V's" movable internal structure is so sensitive that it can change from a normally closed position to an open position, capable of passing 500 ml./hr. when the relative surface levels change in this range.

In FIGS. 1–3, the secondary bottle 13 is shown to be much smaller than the primary bottle 5. The primary bottle might be of 1 liter capacity, and the secondary bottle of 250 ml. capacity. FIGS. 2 and 3 also show the secondary bottle 13 supported above the primary bottle 5, which is hung from wire extension 7. The reason for this is so the secondary bottle 13 will completely empty before the secondary liquid surface level 21 drops a distance $a$ below primary liquid surface level 20. This allows the system to operate when distance $a$ is less than the length of secondary bottle 13. In this case, distance $a$ could be 2 to 3 inches for example.

FIGS, 4, 5, and 6 show a sequence of administering two medical liquids similar to FIGS. 1–3. However, in this second embodiment of the invention, the valve "V" changes from its normally closed position to an open position when the secondary liquid surface level 23 drops a distance $b$ below primary liquid surface level 22. Distance $b$ is greater than the length of secondary bottle 25, so this bottle empties before the primary liquid from bottle 24 resumes. This permits both bottles 24 and 25 to be hung from generally the same height and eliminates the need for wire extension 7. FIGS. 4–6 illustrate that the primary and secondary bottles can be of the same capacity if desired. Here, each bottle is of 1 liter capacity.

Throughout the sequential administration of two medical liquids in FIGS. 1–3 and FIGS. 4–6, the liquids are administered by gravity feed and can be administered over prolonged of time — several hours for instance. If during such prolonged administration, it is desired to add a small volume of another liquid in a relatively short time, this can be done with a conventional hypodermic syringe 26 by injecting this liquid into a puncturable resealable rubber sleeve 27, located near needle 4 in FIG. 2.

In the preceding paragraphs, we have described our unique administration set with its very important valve "V", that permits the set to be used either for administering a single liquid or for sequentially administering two liquids. Now, we examine in more detail, valve "V" and its movable internal structure that causes the administration set to function as it does.

Valve "V" is shown in the drawings in two embodiments. The first embodiment, FIGS. 7–10, shows the valve with an enlarged hollow housing 28, defining a chamber 29. The housing includes a lower section with a tubular side wall 30, which can be transparent or opaque, that tapers inwardly as it proceeds toward a bottom wall 31. This bottom wall integrally joined to the side wall, has a bottom outlet surrounded by a tubular bottom connector 32, which is substantially smaller than side wall 30. This bottom connector 32 fits into conduit 1. The housing also has an upper section 33 that is in the form of a cap that fits across a top of the generally cup-shaped lower portion of the housing. The upper and lower sections are joined together by a tongue and groove arrangement 34. If desired, this tongue and groove arrangement can be secured together merely by a firm friction fit, or by a solvent or adhesive bond. The upper portion 33 has an opening therethrough that is defined by a top connector 35, which is substantially smaller than tubular side wall 30 and joins to conduit 1. The upper portion 33 also has an integral tube section 36 with a longitudinal passage and a generally cylindrical external holding surface spaced inwardly from an inner surface of side wall 30.

Within the hollow housing 28, is the valve's movable internal structure. This structure includes a rubber member with a hollow body portion 37, secured to the external holding surface of tube section 36. We have found that a stretch fit of the rubber body 37 creates sufficient friction to hold the body portion to the tube section. Integral with the hollow body, and projecting downwardly, are two resilient reed portions 38 and 39 that converge toward and contact each other. These reed portions are biased toward each other and hold the movable valve member in a normally closed position.

The valve's movable internal structure automatically opens as shown in FIGS. 9 and 10 when a differential head is applied across the valve in the range of 1 to 20 inches of water. This causes the inner surfaces of reed portions 38 and 39 to move outwardly and permit liquid flow as great as 500 ml./hr. When the head differential is removed, the reed portions automatically move back to their closed position of FIGS. 7 and 8. This automatic movement of the internal structure of valve "V" is important in the sequential administration of two medical liquids as explained previously.

The second embodiment of valve "V" of FIGS. 11 to 14 automatically opens and closes to sequentially administer two liquids as does the first embodiment of the valve. However, here the valve "V" and its movable internal structure have a different construction that provides more accurate control of the opening and closing forces of the valve. This second embodiment of the valve "V" is particularly suited for the administration system shown in FIGS. 4 to 6, where it is desired to have valve "V" open with a head differential of $b$, which is greater than the length of secondary bottle 25. By accurately controlling the opening and closing forces of the valve, both the primary and secondary bottles 24 and 25, can be hung at the same height and there is no need for wire extension 7.

As seen in FIG. 11, the second embodiment of valve "V" has a hollow housing formed by lower section 40, with a tubular connector 41 and an upper section 42, with a tubular connector 43. These two sections are joined together by a tongue and groove arrangement 44. The upper section has an annular downwardly facing valve seat 45, which combines with a generally cylindrical inner wall surface 46 of the upper section to define a pocket. Fitting within this pocket is the movable internal structure, which is a flexible rubber disc 60, with a top or upstream surface 47 abutting the valve seat 45, a lower or downstream surface 48, and a peripheral edge surface 49 of a smaller diameter than the inner wall surface 46. With this arrangement, the disc's edge surface 49 can contact a portion of inner wall surface 46 (FIG. 14) for alignment of its top surface 47 with the valve seat. However, because of its smaller size, a portion of the disc's edge surface is always free of contact with the inner wall surface, and can flex downwardly to open the valve without frictional drag from the inner wall surface 46.

In its normally closed position, the rubber disc, which is imperforate and of uniform thickness, is held against the valve seat with very slight upward pressure applied by a rigid post 50, contacting a central portion of the disc's lower surface. This post 50 is integral with a supporting plate 51 that is very accurately held in position by the housing. By accurately controlling the plate 51 position, the dimensions of post 50, and the thickness of disc 60 in manufacturing the valve "V," its opening and closing forces can be accurately determined so the valve will function as in FIGS. 4 to 6.

The valve shown in its normally closed position in FIG. 11, automatically opens when the predetermined head differential of primary and secondary liquids is applied. In the open position, the disc 60 flexes around post 50, and the liquid flows around the disc and through holes 52, 53, 54 and 55. When the head differential changes, as previously explained, the disc 60 moves to its normally closed position.

The valve "V" of the two embodiments, work very well when the housings of both embodiments, holding tube section 36, and post 50 are all made of a rigid thermoplastic material such as acrylonitrile-butadiene-styrene (ABS) and the movable internal reed portions 38, 39, and disc 60 are of latex rubber.

We have used specific examples to describe our invention in the drawings and specification. However, it is understood that persons skilled in the art can make certain changes to these examples without departing from the spirit and scope of the invention.

We claim:

1. In a system for administering two liquids which includes an administration tube with an upper liquid receiving end, a lower dispensing end, a drip housing between the administration tube ends, a side port below the drip housing, and the system has a secondary tube with an upper liquid receiving end and a lower end connected to the side port of the administration tube, the improvement which comprises:

A first non-pressurized liquid container having liquid therein and connected to the upper end of the administration tube; a second non-pressurized liquid container having liquid therein and connected to an upper end of the second tube; a valve in the administration tube between the drip housing and side port, which valve has a movable internal structure that is normally closed when liquid pressure at opposite ends of the valve are equal, but which valve's internal structure moves to open a passage for liquid flow at a rate of 250 ml/hr with a pressure drop of less than 20 inches of water applied across the valve caused by liquid in the second container dropping below the liquid level in the first container by a distance of less than 20 inches; a puncturable resealable diaphragm closing off the side port; a tubular cannula connected to a lower end of the second tube and extending through the diaphragm; and there is a flow regulator on the administration tube between the side port and lower dispensing end for maintaining a generally constant liquid flow rate from either of the two non-pressurized containers.

2. The combination according to claim 1, wherein the valve includes an expandable member with two resilient reed portions that converge toward each other in a direction from the liquid receiving end to the side port of the administration tube.

3. The combination according to claim 1, wherein the valve has a valve seat; a rigid post in close proximity to the valve seat; and a resilient disc engaging the rigid post and urged by the post against the valve seat.

4. The combination of claim 1, wherein the tube has a puncturable, resealable injection means connected to the tube between the flow regulator and the dispensing end of the tube, whereby gravity flow liquid can be fed through the side port during a prolonged period of time and be regulated by the flow regulator, and an instantaneous injection by a hypodermic syringe or the like can be injected into the injection means without forcing the instantaneous liquid injection through the flow regulator.

* * * * *